Jan. 20, 1959 K. E. OLANDER 2,869,816
SHUT-OFF DEVICE FOR FLEXIBLE TUBES
Filed May 22, 1956
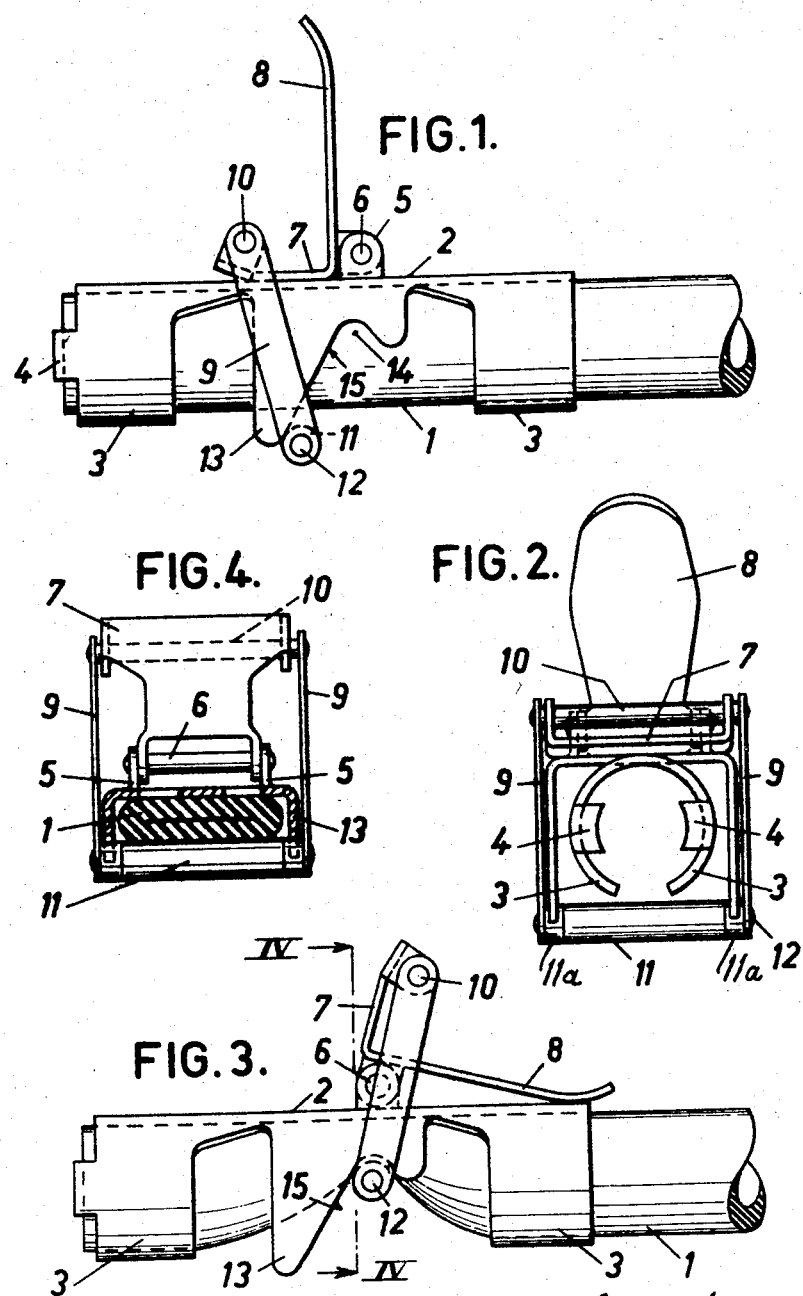
Inventor
Karl E. Olander
by Sommers & Young
Attorneys

United States Patent Office 2,869,816
Patented Jan. 20, 1959

2,869,816

SHUT-OFF DEVICE FOR FLEXIBLE TUBES

Karl Erik Olander, Norrkoping, Sweden

Application May 22, 1956, Serial No. 586,548

Claims priority, application Sweden June 4, 1955

3 Claims. (Cl. 251—6)

The present invention relates to a shut-off device adapted for use instead of usual shut-off valves in connection with flexible tube lines, especially tube lines requiring a careful hygiene, such as, for instance, the milk tubes of milking machine plants. In such tube lines it is of a great importance as far as the cleaning of the tubes is concerned, that the tubes are free to the greatest extent possible from metallic or other members or parts projecting into the path of the milk.

The object of the invention is to provide a shut-off device which is simple in structure and reliable in action, and which automatically locks itself in its active position and remains locked against unintentional operation.

According to a feature of the invention the device comprises, in combination with a mounting adapted to be clamped around the tube, a toggle joint including a frame-like member for compressing the tube and a bell crank lever for controlling said frame member.

According to another feature of the invention the frame-like tube compressing member is provided with a roller for engaging the tube during the compressing action, the mounting having seats for receiving said roller in its compressing position and guiding surfaces for the roller leading to said seats.

In the accompanying drawing an embodiment of the invention is illustrated. Fig. 1 is a side elevation of the device in its open position, and Fig. 2 is a corresponding end view. Fig. 3 is a side elevation of the device in its closed position, and Fig. 4 is a cross section along the line IV—IV of Fig. 3.

With reference to the drawing, the numeral 1 indicates a piece of a flexible tube. Attached to the tube is a mounting 2 which extends along a portion of the length of the tube and is clamped thereto by means of two circularly bent end portions 3 snugly fitting around the tube. In the example shown the mounting is positioned at one end of a tube line. The respective end portion 3 may thus be formed with abutments or claws 4 for coupling the tube together with another tube having a similar coupling means. This detail, however, is immaterial to the invention because of the fact that the mounting 2 and associated elements may be positioned at any desired point of the tube. The mounting 2 is provided with two apertured lugs 5 for receiving a shaft 6 extending crosswise of the tube. Rotatably mounted on said shaft is a bell crank lever forming one element of a toggle joint. Said lever comprises a shorter arm 7 adapted in the open state of the toggle joint to bear against the mounting 2 and a longer arm 8 acting as a handle. The other element of the toggle joint consists of a frame like member for compressing the tube, said frame including two side elements 9 pivotally connected to the shorter arm 7 of the bell crank lever by means of a shaft 10 parallel with the shaft 6 and connected together, on the opposite side of the tube, by means of a shaft 12 parallel with shaft 10. Rotatably mounted on shaft 12 are three independent tubular rollers together surrounding the whole length of shaft 12 between the side arms 9, that is, a longer intermediate roller 11 and two short end rollers 11a.

The mounting 2 carries on opposite sides of the tube, two projections 13 situated in planes parallel with the planes of the side arms 9 adjacent the inner surfaces thereof. Said projections present equipositioned seats 14 for each receiving the roller 11a in its innermost tube-compressing position and oblique guiding surfaces 15 for the rollers 11a leading to said seats.

In the open position of the compressing device shown in Figs. 1 and 2, the shorter arm 7 of the bell crank levers bears, as hereinbefore stated, against the mounting 2, while the longer arm 8, that is to say, the handle, projects substantially radially therefrom. The frame 9, 10, 11, 12 at this moment occupies a position in which the roller 11 is removed from the tube which, as a result, presents an unrestricted area of flow. By turning the handle arm 8 in clockwise direction from the position shown in Fig. 1 to the end position shown in Fig. 3, in which the arm 8 bears against the mounting 2, the rollers 11a move along the guiding surfaces 15 while the longer intermediate roller 11 effects a successive compression of the tube, until the rollers 11a reach the seats 14, at which time the tube is completely compressed by roller 11, as shown in Fig. 4. As will also appear from Fig. 4 the roller 11 may never engage the guide members 13 on the mounting, and the rollers 11a may never come into contact with the tube.

As a result, the compressing roller 11 will be controlled as to its rotation exclusively by its engagement with the tube, that is to say, there will occur only a very slight relative movement between the cylindrical surface of roller 11 and the surface of the tube in contact therewith. Due to this fact the roller 11 causes practically no wear of the tube. The rollers 11a have their rotation controlled exclusively by their contact with the guide surfaces 15 and have no effect on the tube, their purpose being to secure an even compression of the tube by the action of the roller 11, so that there may not appear any unexpected foldings of the tube during the compression. This is of especially great importance in respect of mild tubes, since also the slightest fissure appearing on the inside of such a tube is liable to collect and hold small residues of milk which cannot be removed by even a very thorough rinsing operation. The toggle joint represented by the lever 7, 8 and the frame 9–12, remains locked in said position because of the fact that during the last portion of the clockwise turning of arm 8, the frame has passed the centre of the joint represented by shaft 6, that is to say, the common axial plane of shafts 10 and 12 has moved from one side of the axis of shaft 6 to the opposite side thereof. Thus, the toggle joint will remain locked in its closed state against unintentional release. To open the toggle joint for releasing the tube, arm 8 should be turned in counter-clockwise direction back to the position shown in Fig. 1, thereby causing the roller 11 to restore its position of rest at the lower end of the guiding surfaces 15 out of contact with the tube.

I claim:

1. A shut-off device for flexible tube lines comprising in combination, a mounting adapted to be clamped around the tube so as to expose a portion thereof, the mounting being formed with parallel oblique guide surfaces on opposite sides of the tube, a bell crank lever pivoted to the mounting for turning about an axis extending at right angles to the longitudinal direction of the mounting and the tube, links pivoted to one arm of said lever on opposite sides of the tube, a transverse shaft carried by said links on the side of the tube remote from the bell crank lever, a roller rotatably mounted on said shaft out of contact with said guide surfaces for compressing the exposed portion of the tube by a turning of the lever in one direction, and separate rollers rotatably mounted on said shaft for engaging the guide surfaces of the mounting during said movement, said separate rollers being out of contact with the tube in all positions they may occupy.

2. In a shut-off device as claimed in claim 1, the further feature that the mounting is formed with seats at the innermost ends of said guide surfaces for receiving the guide rollers at the end of the compressing operation.

3. In a shut-off device as claimed in claim 1, the further feature that the bell crank lever and the links pivoted thereto together with the roller supporting shaft connecting said links at their ends remote from the bell crank lever constitute a toggle joint, the guiding surfaces formed on the mounting being so positioned as positively to cause the common axial plane of the pivots of the links to pass through the axis of the pivot of the bell crank lever during the turning of said lever between its end positions.

References Cited in the file of this patent

UNITED STATES PATENTS

| 261,354 | Johnson | July 18, 1882 |

FOREIGN PATENTS

| 147,463 | Australia | of 1952 |
| 180,217 | Austria | of 1954 |